(12) United States Patent
Unrath et al.

(10) Patent No.: US 6,361,577 B1
(45) Date of Patent: Mar. 26, 2002

(54) CASSETTE FILTER

(75) Inventors: Dieter Unrath, Weinheim; Margit Hofmann, Gorxheimertal, both of (DE)

(73) Assignee: Firma Carl Freudenberg, Weinheim (DE)

( * ) Notice: Subject to any disclaimer, the term of this patent is extended or adjusted under 35 U.S.C. 154(b) by 795 days.

(21) Appl. No.: 08/591,857

(22) Filed: Jan. 26, 1996

(30) Foreign Application Priority Data

Jan. 26, 1995 (DE) .......................................... 195 02 366

(51) Int. Cl.⁷ ................................................ B01D 29/07
(52) U.S. Cl. ............................ 55/482; 55/497; 55/498; 55/500; 55/511; 55/DIG. 31
(58) Field of Search ......................... 55/497, 498, 502, 55/500, 524, DIG. 31, 511, 482

(56) References Cited

U.S. PATENT DOCUMENTS

| | | | |
|---|---|---|---|
| 3,246,457 A | * | 4/1966 | DeBaun ........................ 55/499 |
| 3,386,231 A | | 6/1968 | Nutting |
| 3,397,518 A | * | 8/1968 | Rogers .......................... 55/497 |
| 4,227,953 A | * | 10/1980 | Wasielewski ................. 55/497 |
| 4,685,944 A | * | 8/1987 | Allan et al. .................... 55/497 |

FOREIGN PATENT DOCUMENTS

| | | | | |
|---|---|---|---|---|
| EP | 0 302 329 | | 2/1990 | |
| GB | 790181 | * | 2/1958 | ................... 55/497 |
| GB | 2103106 | * | 2/1983 | ................... 55/497 |

* cited by examiner

Primary Examiner—Robert A. Hopkins
(74) Attorney, Agent, or Firm—Kenyon & Kenyon

(57) ABSTRACT

A cassette filter made of a case open at either end that is formed of flat sheets which surround a dimensionally stable filter pack in a dust-tight manner. The sheets are cemented to each other and to the filter pack by means of adhesive layers and are spatially fixed in position by the filter pack.

26 Claims, 3 Drawing Sheets

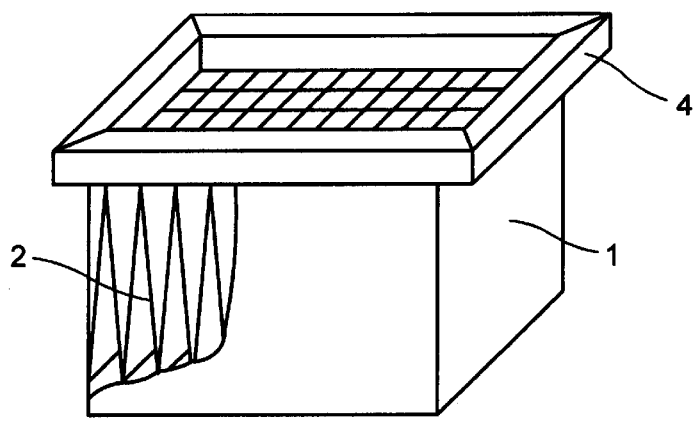
F I G. 3
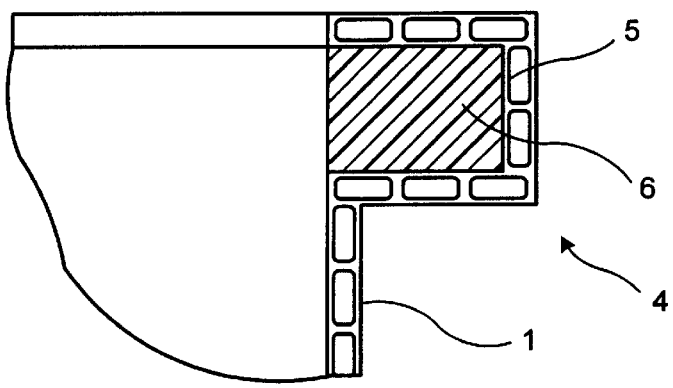
F I G. 4
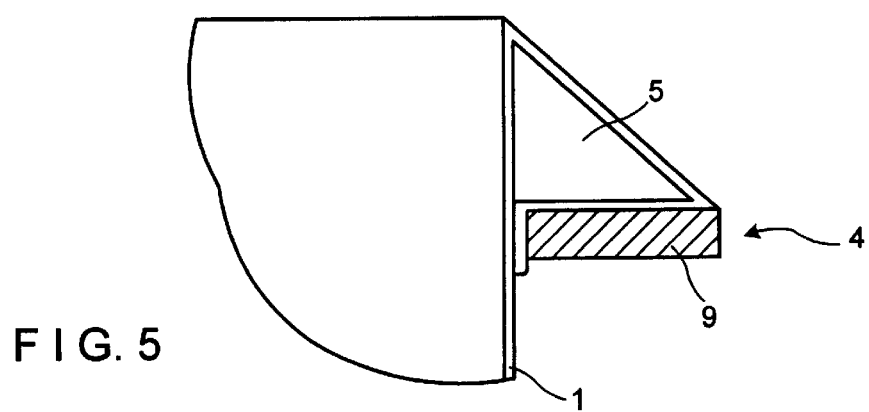
F I G. 5

CASSETTE FILTER

BACKGROUND OF THE INVENTION

The invention relates generally to a cassette filter and, more particularly, to a cassette filter composed of a cylindrical case surrounding a dimensionally stable filter pack in a dust-tight manner.

Such a cassette filter is known from U.S. Pat. No. 3,386,231 (the contents of which are incorporated herein by reference). In this patent, both the filter pack and the case are each constructed to be dimensionally stable. While this is an effective approach, it entails significant production costs.

SUMMARY OF THE INVENTION

The present invention is directed to the problem of simplifying the production, and hence the production costs, of cassette-type filters. A case, open at its upper and lower ends and formed of flat sheets, surrounds a dimensionally stable filter pack in a dust-tight manner.

The sheets which form the case (the housing of the filter pack) are cemented to one another and to the filter pack by means of adhesive layers, and are spatially fixed in position by the filter pack. The present invention is based on the realization that the dimensional stability of conventional filter packs and the adhesive layers required in any event for affixing the filter pack to the case in a dust-tight manner obviates the need to use a case which itself is dimensionally stable. Consequently, according to the present invention, the case obtains dimensional stability only by being cemented to the filter pack by means of secondary adhesive layers. This, surprisingly, provides good overall stability even though, considered by themselves alone, neither the filter pack nor the case is particularly dimensionally stable. In this manner, the cost of producing a cassette filter according to the invention is considerably reduced.

The sheets needed to form the case can consist of any pliable sheeting, for example wood, metal, cardboard and/or plastic. To minimize weight, the use of so-called webbed double sheets made of plastic has proven advantageous.

The sheets necessary to form the case can be produced independently of one another and be joined to one another and to the filter pack solely by adhesive layers. However, a merging-type construction of the sheets in the form of an endless band is possible as well, and present an advantageous way of commercially producing the cassette filter. In this embodiment, the individual sheets are laid around the filter pack consecutively and separated from the band in the necessary size. The dimensional accuracy and dimensional stability of the cassette filter can be further increased by this means.

In order to prevent damage to the filter pack during transport or installation, the case can be sealed in the area of the air inlet or air outlet side by means of a protective grid or by another sheet, which optionally may be removable.

The adhesive layers can constitute a component of a double-sided adhesive tape. Such tape provides a particularly uniform distribution and thickness, which makes it easier to assure the quality of adhesion. The steps of attaching the elements to one another can be accomplished especially quickly and cleanly. Alternatively, the sheets may be directly coated with an adhesive agent.

An especially reliable degree of sealing and bonding between the individual sheets and the filter pack is achieved by employing for the adhesive layers in all glued areas a compound that consist of an identically compounded thixotropic adhesive, e.g., a polyurethane adhesive. In particular, shifting movements following the joining of the individual layers can be prevented by this means, regardless of position. This is of significant importance with respect to assuring a dust-tight bonding between the filter pack and the sheets, particularly where a change in position and possibly rotation of the cassette filter around a horizontal axis must be carried out prior to the final hardening of the adhesive agent. Such movements may occur, for example, during storage and/or packing.

The attainment of a dust-tight level of bonding between the outer surface of the case and a framework structure receiving the case is substantially simplified if the sheets are provided with a supporting flange pointing outwardly at least at one end, preferably the end facing the oncoming flow of air. The supporting flange extends essentially transversely to the direction of the in-flowing air. This greatly reduces the danger that dust will somehow by-pass the cassette filter. In addition, a sealing element can be provided between the structure receiving the case and the supporting flange. This sealing element can, for example, be a sealing device made of an elastically deformable material. If desired, the sealing element can also be cemented to the supporting flange.

To reduce weight, it has proven advantageous for the sheets and/or the supporting flange to be configured to surround at least one cavity. If needed, the cavity can contain a filler, for instance one made of a rigid foam, in order to improve the dimensional stability of the device. If needed, the filler can be cemented in place within the cavity.

In another embodiment at least two sheets opposite one another are provided with a holding element for a preliminary filter at the end facing the in-flowing air. In the simplest case, this can be formed as a foldable extension of the sheets, which has the further advantage of being unobtrusive during the transport of the cassette filter.

BRIEF DESCRIPTION OF THE DRAWINGS

FIG. 3 is a partially cut-away front perspective view of the cassette filter shown in FIG. 1; and FIGS. 4 to 7 illustrate additional embodiments of the end portions of the sheets.

DETAILED DESCRIPTION

Figure 1:
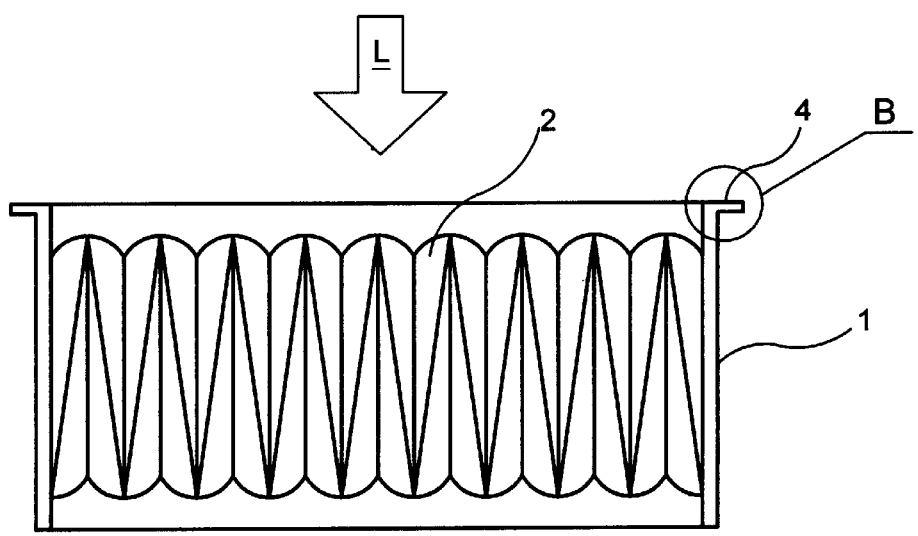
FIG. 1 is a longitudinal sectional view of a cassette filter constructed according to the principles of the invention.
Figure 2:
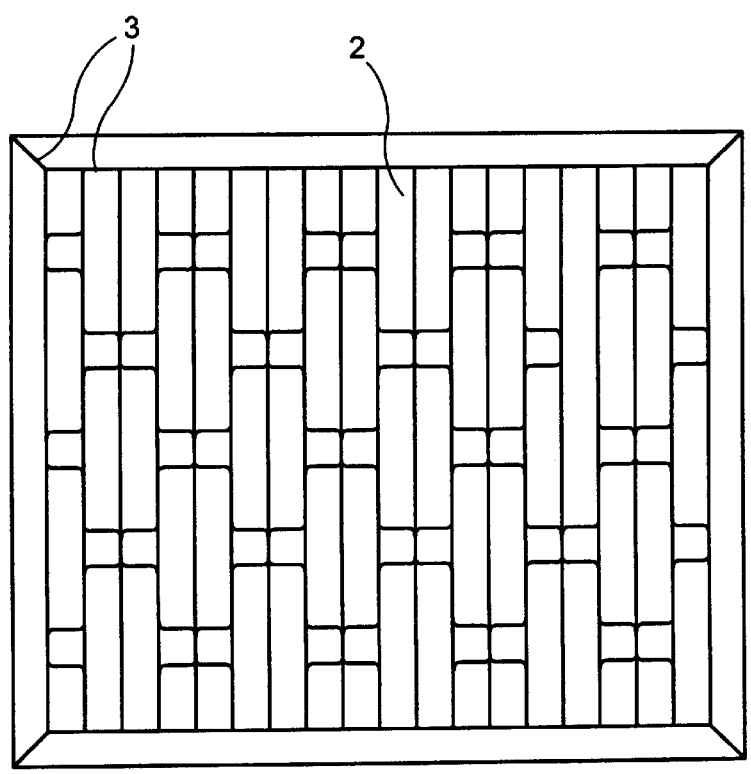
FIG. 2 is a frontal view of the cassette filter shown in to FIG. 1.

The cassette filter shown in FIGS. 1–3 consists of a topless and bottomless case formed by flat sheets 1, which surround a dimensionally stable filter pack 2 in a dust-tight manner. The sheets 1 are cemented to one another and to the filter pack 2 by means of adhesive layers, so that they are spatially fixed in position by the filter pack 2.

Polyurethane is used as the adhesive as it possesses thixotropic properties. Hence, it is not necessary for the sheets 1 to have great wall thickness. Rather, the sheets are lent a level of spatial fixation on account of the adhesive link to the filter pack 2 as to provide an excellent level of stability with regard to their mutual allocation to one other and to the filter pack 2.

In the present case, the sheets 1 consist of flexurally stiff plastic films which are provided with supporting flanges 4 pointing outwardly at the end facing the in-flowing air. These supporting flanges 4 extend in a direction perpendicular to the direction of the in flowing air. They are constructed in such a way that, after insertion in the support structure (not depicted in the drawing), the resulting fitting to the support structure is flush with the surface and dust-tight. If required, additional sealing elements, such as those made of an elastically deformable material, can be provided between the support structure and the supporting flanges 4.

The filter pack can correspond to the type described in the European patent application 0 382 329. According to this design, the filter pack may take the form of a zigzag-shaped folded strip of a flexible filter matting whose sequential partial sections are provided with mirror-inverted deep gofferings (crimps) and which are braced against each other by the deep gofferings in tightly adjoining partial areas. Consequently, the filter pack possesses excellent dimensional stability, which simplifies its cementing to the sheets. In addition, it can withstand relatively great compressive loads in any direction without giving way in a significant manner. That is why filter packs of this type are preferably used. As needed, they can also be made of paper, glass fiber paper, formed fabric or other appropriate materials. The use of filter pack types produced differently from this is possible as well, for example, the kind in which the adjacent filter surfaces are braced against each other by separately produced spacer elements or have such great dimensional stability that any direct contact of the adjacent filter surfaces is of little concern under the pressure of the air to be cleaned. The use of spacers can be unnecessary, particularly, when the folds of the folded filter made of a relatively rigid filter medium have a slight depth.

Figure 6:
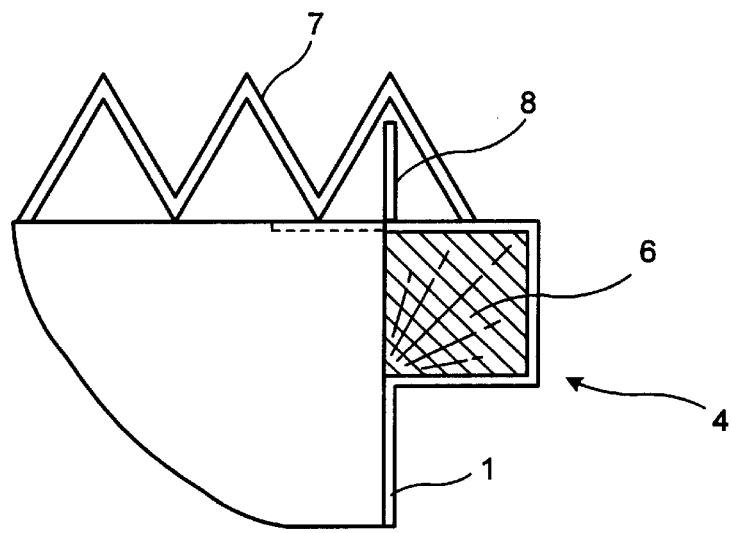

In FIGS. 4 through 6, additional embodiments of the corner areas of cassette filters similar to that shown in FIG. 1 are shown. (These views relate to the region designated with "B" in FIG. 1.)

The embodiment shown in FIG. 4 is of a cassette filter in which the sheets 1 are bent several times at the end facing the in-flowing air and surround a cavity that is open to the inside. A molded article 6 made of a hard plastic is cemented in place in the cavity 5. The sheets contain a plurality of cavities 5 extending parallel to one other. The sheets 1 are made of plastic and, because of the presence of the cavities, have both great dimensional stability and low weight.

FIG. 5 presents a design variant in which the sheets 1 are bent several times at the end facing the in-flowing air to form a supporting flange 4 and jointly surround a cavity 5. The triangular structure resulting in this case is statically stable and quite dimensional stable. At the end facing the support structure during normal use, the supporting flange 4 is cemented to a flexible foam layer 9. By this means, a good sealing is attained after the insertion of the cassette filter into a support structure if a slight minimum contact pressure is achieved, for example by use of pressure springs or clamps.

In FIG. 6 illustrates an additional embodiment in which the case is made of a hard paper as well. Its end facing the in-flowing air surrounds a cavity open to the inside into which a supporting body 6 made of wood is cemented in place. The wooden insert provides the case with a great dimensional stability. The end 8 of the sheets facing the in-flowing air is constructed in a manner that it can be folded. In FIG. 6 it is shown in the unfolded state and is inserted into a fold filter 7. This serves as a preliminary filter during normal use, and keeps out coarse dirt and dust from the actual filter pack 2. The service life is substantially improved by this approach. The cassette filter consists entirely of materials which can be incinerated and therefore be readily disposed of after use by burning.

Figure 7:
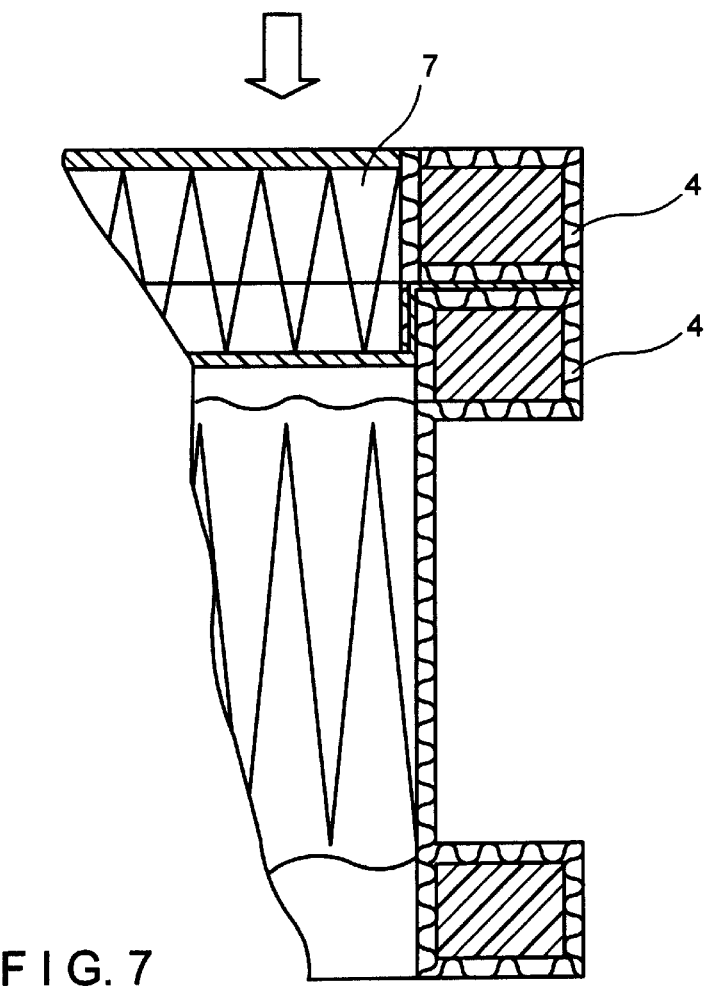

In FIG. 7 a cut-away portion of a cassette filter is shown in which a preliminary filter 7 is affixed to the case of the cassette filter by means of a plug-in connection. Both the cassette filter and the preliminary filter 7 are provided with a supporting flange. During normal use, both supporting flanges rest on one another, making a seal. Alternatively, an elastic sealing band can be provided in a space which is possibly present between the supporting flanges, for example to compensate for surface irregularities.

What is claimed is:

1. A cassette filter comprising:
   a dimensionally stable filter pack; and
   a cylindrical case that surrounds the filter pack in a dust-tight manner, said case comprising flat sheets that are cemented to one another and to the filter pack via adhesive layers, said sheets alone not having enough mechanical strength to provide a cassette that is dimensionally stable, but having in combination with the adhesive layers and filter pack sufficient strength for this purpose;
   wherein the sheets are fixed in position via their connection to the filter pack.

2. The cassette filter according to claim 1, wherein the adhesive layers comprise a thixotropic adhesive.

3. The cassette filter according to claim 2, wherein the adhesive is a polyurethane adhesive.

4. The cassette filter according to claim 1, wherein the sheets are provided at least at one end with a supporting flange pointing outwardly.

5. The cassette filter according to claim 2, wherein the sheets are provided at least at one end with a supporting flange pointing outwardly.

6. The cassette filter according to claim 1, wherein the sheets surround at least one cavity.

7. The cassette filter according to claim 4, wherein the supporting flange surrounds at least one cavity.

8. The cassette filter according to claim 6, further comprising a filler that is contained within the cavity.

9. The cassette filter according to claim 8, wherein the filler consists of a rigid foam.

10. The cassette filter according to claim 8, wherein the filler is cemented in place into the cavity.

11. The cassette filter according to claim 1, wherein a holding device for a preliminary filter is provided at least at one end of the case.

12. The cassette filter according to claim 11, wherein the holding device is formed by a foldable extension of a sheet.

13. The cassette filter according to claim 11, further comprising a preliminary filter.

14. The cassette filter according to claim 13, wherein the case and the preliminary filter linked to each other via a plug-in fit.

15. A cassette filter comprising:

a dimensionally stable filter pack; and a cylindrical case that surrounds the filter pack in a dust-tight manner, said case comprising flat sheets that are cemented to one another and to the filter pack via thixotropic adhesive layers of polyurethane, said sheets alone not having enough mechanical strength to provide a cassette that is dimensionally stable, but having in combination with the adhesive layers and filter pack sufficient strength for this purpose;

wherein the sheets are fixed in position via their connection to the filter pack.

16. The cassette filter according to claim 15, wherein the sheets are provided at least at one end with a supporting flange pointing outwardly.

17. The cassette filter according to claim 15, wherein the sheets are provided at least at one end with a supporting flange pointing outwardly.

18. The cassette filter according to claim 15, wherein the sheets surround at least one cavity.

19. The cassette filter according to claim 16, wherein the supporting flange surrounds at least one cavity.

20. The cassette filter according to claim 18, further comprising a filler that is contained within the cavity.

21. The cassette filter according to claim 20, wherein the filler consists of a rigid foam.

22. The cassette filter according to claim 20, wherein the filler is cemented in place into the cavity.

23. The cassette filter according to claim 15, wherein a holding device for a preliminary filter is provided at least at one end of the case.

24. The cassette filter according to claim 23, wherein the holding device is formed by a foldable extension of a sheet.

25. The cassette filter according to claim 23, further comprising a preliminary filter.

26. The cassette filter according to claim 25, wherein the case and the preliminary filter linked to each other via a plug-in fit.

\* \* \* \* \*